(12) United States Patent
Olliges et al.

(10) Patent No.: US 6,189,446 B1
(45) Date of Patent: Feb. 20, 2001

(54) SYSTEM FOR THE SECURE DESTRUCTION OF COMPACT DISC DATA

(76) Inventors: William Olliges, 5027 SW. Moore St., Palm City, FL (US) 34990; Anthony Billitteri, 2700 N. A1A, Unit 401, Ft. Pierce, FL (US) 34949

( * ) Notice: Under 35 U.S.C. 154(b), the term of this patent shall be extended for 0 days.

(21) Appl. No.: 09/303,325

(22) Filed: Apr. 29, 1999

Related U.S. Application Data

(60) Provisional application No. 60/115,078, filed on Jan. 7, 1999.

(51) Int. Cl.$^7$ .................................................... B44B 5/00
(52) U.S. Cl. ................................. 101/6; 101/4; 264/293
(58) Field of Search .................................. 101/4, 5, 6, 9, 101/10, 11, 22, 23, 32; 264/293

(56) References Cited

U.S. PATENT DOCUMENTS 5,520,865 * 5/1996 Sargent, III et al. ................. 264/106

FOREIGN PATENT DOCUMENTS

| 4443693 | * | 6/1996 | (DE) . |
| 19627960 | * | 1/1998 | (DE) . |
| 2732810 | * | 10/1996 | (FR) . |

* cited by examiner

Primary Examiner—Daniel J. Colilla
(74) Attorney, Agent, or Firm—McHale & Slavin

(57) ABSTRACT

An apparatus and process for the rendering unintelligible of data stored on digital and analog recording media employs a means for embossing the media and a means for driving the media to traverse a path defined by the means for embossing. In one embodiment, the means for embossing includes knurled rollers that distort the surfaces of recording media passed therebetween. In one embodiment, the means for driving the recording media through the means for embossing includes a motor and at least one drive gear operatively associated with the means for embossing. The process for rendering recorded data unintelligible includes the steps of providing a means for embossing, providing a means for driving recording media through the means for embossing, and urging recording media through the means for embossing.

12 Claims, 3 Drawing Sheets

SYSTEM FOR THE SECURE DESTRUCTION OF COMPACT DISC DATA

RELATED APPLICATION

This non-provisional application, which is based upon provisional application Ser. No. 60/115,078, filed on Jan. 7, 1999, claims benefit of the filing date thereof in accordance with 35 USC 119(e). The contents of said provisional application Ser. No. 60/115,078 are herein incorporated by reference.

FIELD OF THE INVENTION

This invention is directed generally to the field of data destruction and, more particularly, to a device that destroys the data contained on compact discs.

BACKGROUND OF THE INVENTION

Compact discs, also known as CD's, are convenient, durable storage devices that are capable of holding large amounts of data. Information on a CD is typically recorded as a series of peaks and valleys located on a reflective metallic layer disposed within the disc itself.

The information stored on a CD is not directly readable by the human eye; a CD player is typically used to access data stored on a given CD. CD players use lasers to "read" CD's, gathering information about the peaks and valleys on the reflective layer of a given disc. This information is processed by an associated computer which then converts the information for use.

Since the data stored on a compact disc is not accessible directly and must be converted before use, it is possible to prevent retrieval of the stored information without physically destroying the entire disc. Altering the disc so as to prevent access to, and conversion, of the stored data will essentially prevent retrieval of the information stored on the disc. In other words, data stored on an "unreadable" disc is often irretrievable.

However, due to advances in technology, the definition of what it means for a disc to be "unreadable" is evolving. It is possible, for example, to retrieve data from very small regions of a damaged compact disc. Data recorded on a CD that is otherwise unreadable with typical CD players may often still be retrieved through the use of specialized machines. As a result, simply making a disc "non-playable" does not necessarily guarantee that the information on the disc is irretrievable. It is possible, by means of special laser reading devices, to retrieve information from small particles of compact discs. Particle size has to be reduced to 0.25 mm before this retrieval method is rendered useless.

To achieve secure destruction of the information on a compact disc, the disc must be altered so that no technology can be employed to access any of the information previously recorded on the disc. As used in this application, the term "secure" destruction of data refers to the destruction of data in a manner that makes the data irretrievable by any means. The irretrievability requirement is of particular importance to government-agencies, especially those agencies involved with issues of national security.

For archival purposes, it is often desirable to retain the disc and label in readable condition, even though destruction of the underlying data is desired. In many instances, the complete destruction of a disc containing sensitive information is not desirable. In some cases, it may be appropriate to keep discs from which no data may be recovered. In situations involving national security, for example, maintaining archives of discs that have been rendered unintelligible will help establish that certain discs have actually been rendered unintelligible, rather than stolen or misplaced. Without an archive of unintelligible, yet identifiable, discs, falsified records may incorrectly indicate that discs with sensitive information have been "destroyed," leading to possible information leaks. This type of archive requires a data destruction system that maintains the media labeling information, while rendering unintelligible the underlying data.

Several approaches have been explored in an attempt to achieve secure destruction of CD data. These approaches have included, among other things, the use of heat, chemical etching compounds, and standard abrasives. Unfortunately, none of these approaches has been adequate. Heating of CD's, for example, resulted in flaking of the information-containing layer. This flaking often produced loose pieces of the disc where the flake size was large enough to allow retrieval of information. Furthermore, chemical etching resulted in the production of noxious fumes which were sufficiently strong to be totally unacceptable in office environments. Abrasives, such as those used in conventional sanders, became so quickly loaded with removed debris that they were rendered useless after only a relatively-short period of use. In fact, early abrasives could not even securely destroy three CD's before the abrasive required replacement. Such a short life span is unacceptable.

Other approaches have used brushes or pads that contact a CD while the CD rotates. Several United States patents have been issued for these devices, as shown in U.S. Pat. Nos. 4,654,918; 4,662,025; and 4,709,437. However, none of the devices described in these patents is directed to the destruction of the information on the CD. They are merely directed to the cleaning of compact discs and, as such, do not accomplish the task of secure destruction.

A device for the secure destruction of CD data must irretrievably destroy the data on the disc without producing noxious fumes and must continue to operate over an extended period of time, having the capacity to destroy the information on more than three CD's.

Primitive abrasive systems that securely destroy the information on some types of CD's have recently been developed. Unfortunately, these abrasive systems are currently only suitable for destroying the information recording surfaces found on read-only CD's, which use aluminum recording surfaces. The abrasive systems used to destroy aluminum-surfaced discs are not satisfactory, however, for newer, recordable CD's which use gold recording surfaces. A new approach to securely destroy data stored on CD's having non-aluminum-based recording surfaces is required.

Thus, what is needed is a compact disc data destruction device that includes advantages of the known devices, while addressing the shortcomings they exhibit. The compact disc data destruction device should alter selected compact discs to destroy the data recorded on the disc so that recovery of the data is prevented. The device should also destroy the information on a compact disc while leaving the associated disc label in a legible format, so that the disc may be identified and accurately stored or discarded as needed. The device should also be clean to use and should not produce noxious fumes. The device should also be useable for an extended period of time, enabling destruction of data on many CD's, regardless of the type of material used for the disc information bearing surface. The device should also be economical and easy to use.

SUMMARY OF THE INVENTION

The present invention is a system for securely destroying data contained on compact discs (CD's) having gold or aluminum information bearing surfaces (IBS's). The system includes at least one pair, and typically two pairs, of rollers with each roller being rotatably mounted between rigid support plates.

A CD containing information to be destroyed passes between the rollers under pressure. The roller exteriors contain raised patterns that are impressed into the surface of the disc as the disc passes between the rollers. The disc surface is significantly distorted as the disc passes between the rollers. After passing between the rollers, the disc is characterized by lines of distortion that are approximately 0.25 mm apart. This spacing results in a CD from which no useful information can be retrieved. It is noted that the present invention could also be used to destroy data on a variety of recording media, including, but not limited to analog phonograph records, Digital video discs (DVD's), and laser video discs.

Several aspects of the present invention cooperate to produce a high level of information-destroying effectiveness. First, the patterns on the rollers may be varied greatly to avoid embossing predictable patterns on a disc. Second, the bottom-facing rollers distort the clear substrate of the disc, making it more difficult to read the data on the metal surface through the substrate. Third, the pattern on each set of rollers may be different, thereby embossing cooperative, overlaying patterns. This overlay results in a widespread distortion of the disc surfaces, with distances between embossed lines much smaller than would normally be produced by a single set of rollers.

Additionally, since no abrasives are used in destroying the disc, there is no need for particle collection and removal. This advantageously results in a simple device that is clean and trouble-free. The information-destroying pattern embossed on the disc beneficially does not affect the label printed on the disc. As a result, the present invention destroys data, yet preserves the original identification information used for record keeping purposes.

Thus, it is an objective of the present invention is to provide a device that securely destroys the data contained on CD's incorporating either aluminum or gold information bearing surfaces.

An additional objective of the instant invention is to provide a compact disc data destruction device that alters selected compact discs to destroy the data recorded on the disc so that recovery of the data is prevented.

Yet another objective of the instant invention is to provide a compact disc data destruction device that destroys the information on a compact disc while leaving the associated disc label in a legible format, so that the disc may be identified and accurately stored or discarded as needed.

A further objective of the instant invention is to provide a compact disc data destruction device that is clean to use and does not produce noxious fumes.

Still an additional objective of the instant invention is to provide a compact disc data destruction device that is useable for an extended period of time, enabling destruction of data on many CD's, if desired.

A still further objective of the instant invention is to provide a compact disc data destruction device that is economical and easy to use.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1A:
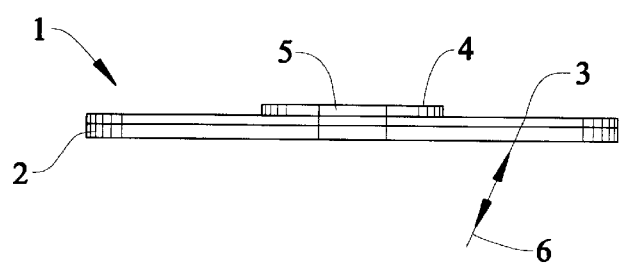
FIG. 1A is a side elevation view of a compact disc.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Figure 1B:
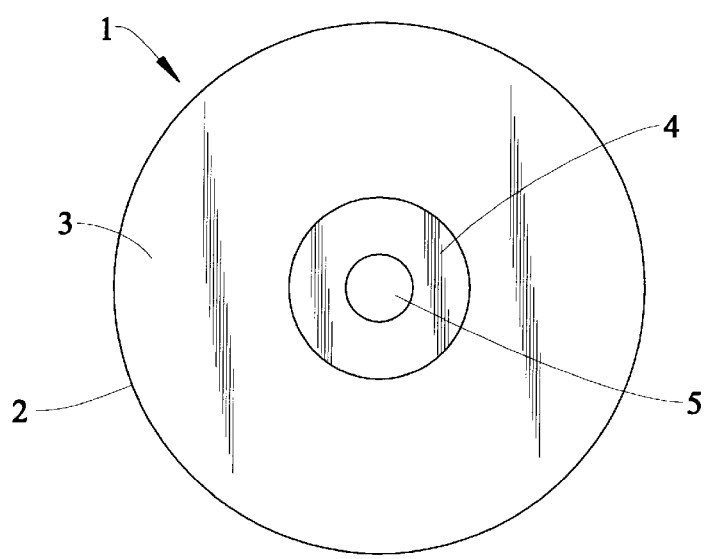
FIG. 1B is a top plan view of a compact disc.
Figure 1C:
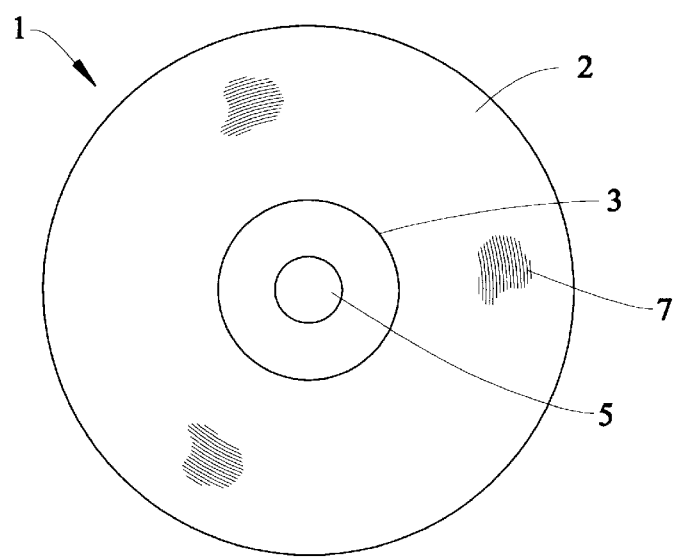
FIG. 1C is a bottom plan view of a compact disc.

To understand the present invention, it is necessary to briefly review the construction and operation of a standard compact disc (CD). FIGS. 1A, 1B and 1C show, respectively, a side sectional view, a top plan view, and a bottom view of a compact disc. The CD may alternatively be referred to as a CD-ROM (Compact-Disc-Read-Only Memory) or a CD-WORM (Compact-Disc Write-Once-Read-Many). Many acronyms are used to describe the CD and similar optical recording media.

In FIG. 1A, it can be seen that the CD 1 comprises several layers, the first of which is a layer of clear polycarbonate 2. The polycarbonate layer 2 forms the basic substrate for the CD 1. The next layer 3 is a thin layer of reflective metal film located on the upper side of the polycarbonate disc 2. This reflective layer 3 is the recording media in the CD 1. Above the metal layer 3 is a label 4. The label 4 often consists of silk-screened ink and a protective lacquer coat and forms the top surface of the CD 1. For CD's that carry classified data, the label 4 is typically a narrow band near the center of the disc about a central aperture 5. This aperture 5 is used to position and spin the CD 1 in recording and playback operations. It should be noted that the reflective metal layer 3 and the label 4 are generally very thin in comparison with the polycarbonate substrate 2, but have been shown relatively-large in FIG. 1A, for the sake of clarity.

FIG. 1C shows a bottom view of a CD in which there appears to be a plurality of rings 7. These "rings" 7 are actually a single, tightly-wound spiraling groove, similar to that found on an audio record disc. The single spiraling groove 7 is located on the top surface of the CD substrate 2, but is visible only from the lower side, through the clear polycarbonate substrate 2. The spiraling groove 7 generally cannot be seen from the top of the CD 1, because the groove is filled in by the metal layer 3.

To read information contained on a CD 1, the CD is placed in a CD player and rotated about the disc central axis;

the disc central axis coincides with the center of the disc aperture 5. A laser beam, such as beam 6 shown in FIG. 1A, is directed to illuminate precisely-selected portions of the spiral groove 7. The beam 6 is typically directed from under the CD 1. More particularly, the laser beam 6 passes through the clear polycarbonate substrate 2 of the CD 1 and travels to the reflective metal layer 3.

Upon striking the reflective metal layer 3, the laser beam 6 illuminates information-carrying indentations, not shown, located thereupon. In turn, portions of the laser beam 6 are reflected back to an optical sensor, not shown, which produces electrical output that varies in accordance with the reflected laser beam 6.

As described above, it is the reflective metal layer 3, located near the top of the CD, that carries data. It is, therefore, this information bearing surface 3 which must be distorted if secure data destruction is to be achieved. As used herein, the term secure data destruction refers to destruction that alters a CD 1 so that no intelligible information can be retrieved from the CD.

Information is recorded onto CD's by forming small pits, not shown, at desired locations along the single spiral groove 7. The pits are typically about 0.5 micrometers wide and 0.833 micrometers long. During playback, the pits are "read" by a 780-nanometer laser diode, the light from which is invisible to the naked eye.

The present invention 100 distorts a CD 1 sufficiently to prevent a laser 6 from reading information stored within the groove 7. This is due to a number of physical changes the rollers 10a, 11a, 12a, and 13a of the present invention 100 impart on a CD 1 that passes therebetween. Among other things, these changes include distortion of the shape of the pits, movement of the pits from their original positions, displacement of the reflective layer 3 at the base of the pits so that the laser beam 6 is no longer reflected back properly to the optical sensor, "filling in" of the pits by the crushing action of the rollers 10a, 11a, 12a, and 13a, and production of imperfections, on the substrate 2 and reflective surface 3, that block light 6 from the laser and interfere with laser light reflection. Cooperatively, these physical changes make retrieval of data carried by the information bearing surface 3 (IBS) of a CD 1 impossible.

In keeping with the objectives of the present invention, the destruction of information by this method is effective with a wide variety of IBS's 3, including those that are aluminum or gold. In this manner, the present invention provides increased utility over the prior art, including abrasive systems limited to the destruction of aluminum IBS's.

Figure 5:
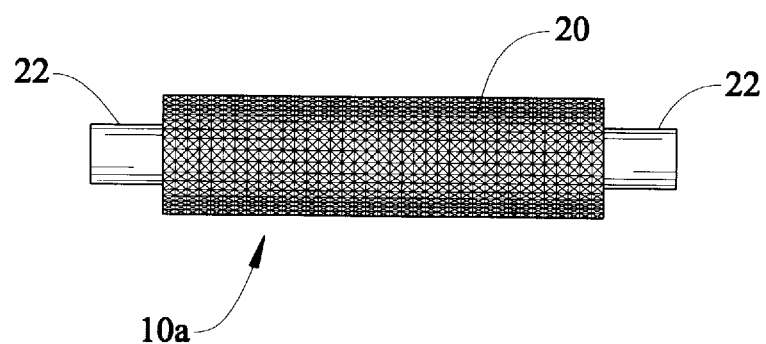
FIG. 5 is a front view elevation of a set of rollers used in the present invention.

During use of the present invention 100, a CD 1 passes between a first roller 12a and second roller 11a progressively applying pressure to the CD. The CD then continues moving, being forced to pass between a third roller 10a and a fourth roller 13a. The roller surfaces 20 include a fine pattern that is impressed on the CD 1 as the CD travels between the first pair of rollers 11a, 12a and then between the second pair of rollers 10a,13a. One preferred pattern 20 is seen in FIG. 5. As the CD 1, passes among the rollers 10a,11a,12a, and 13a, the reflective information bearing layer 3 is distorted and subsequent retrieval of data on that layer is prevented.

In keeping with the objectives of the present invention, the fine pattern 20 advantageously does not destroy an identification label 4 printed on the CD 1. As a result, the CD 1 may still be identified for archival purposes, even after the data contained on the disc 1 is no longer readable.

Figure 2:
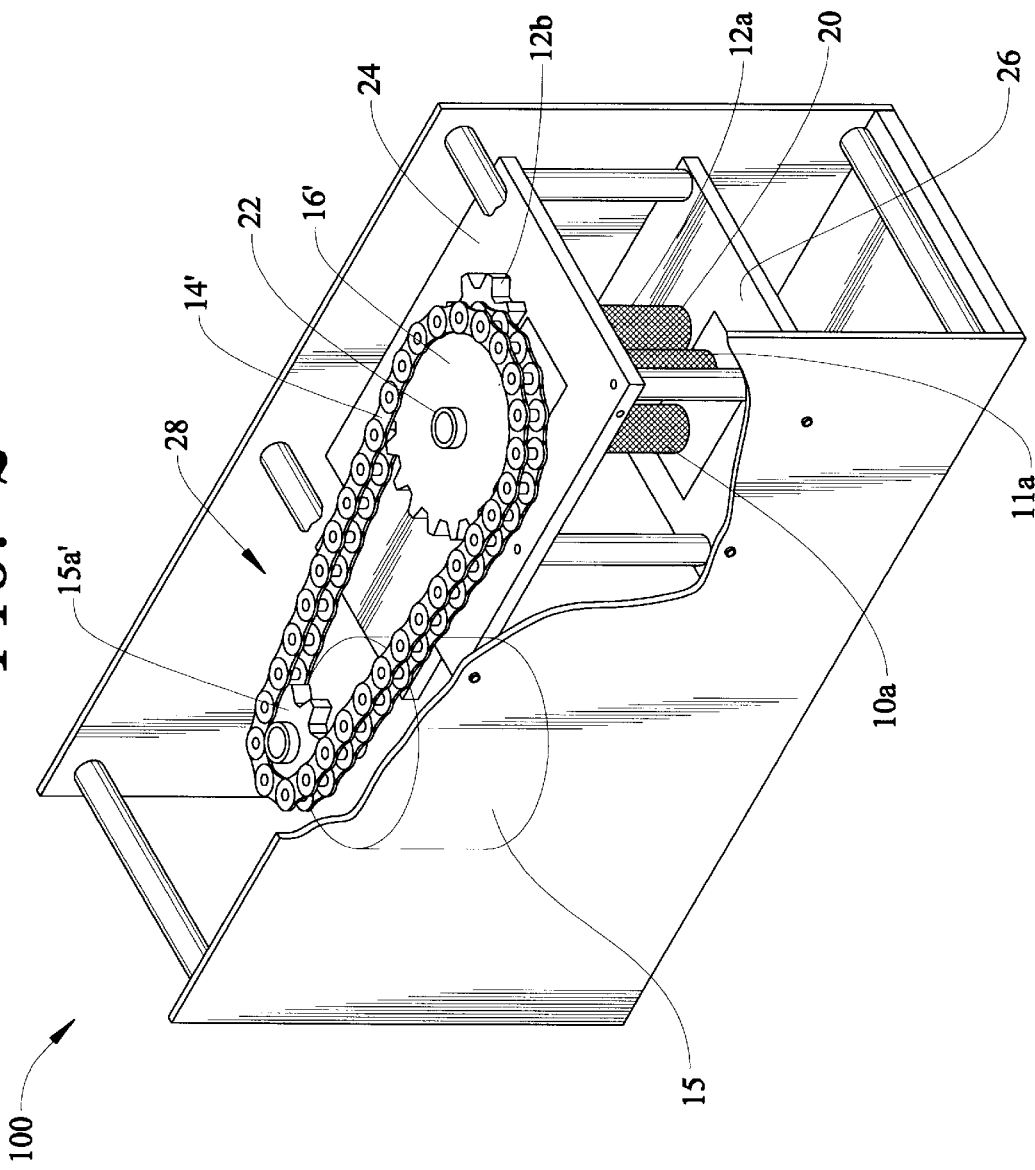
FIG. 2 is a pictorial view of the compact disc data destruction device of the present invention.

FIG. 2 shows a pictorial view of the present invention 100. As described above, the present invention 100 includes a first pair of rollers 10a,11a and a second pair of rollers 12a,13a. A first driving gear 10b is disposed on the first gear 10a, and a second driving gear 12b is disposed on the third roller 12a.

The driving gears 10b,12b are coplanar and sized so that gear 10b engages gear 12b during rotation. With this arrangement, when the first roller 10a rotates, the first drive gear 10b engages the second drive gear 12b, thereby rotating the third roller 12a. This ensures that the device 100 will force a CD 1 through both sets of rollers 10a,11a and 12a,13a with continued rotation of the drive gears 10b,12b. Other numbers of drive gears may also be used, if desired.

Figure 3:
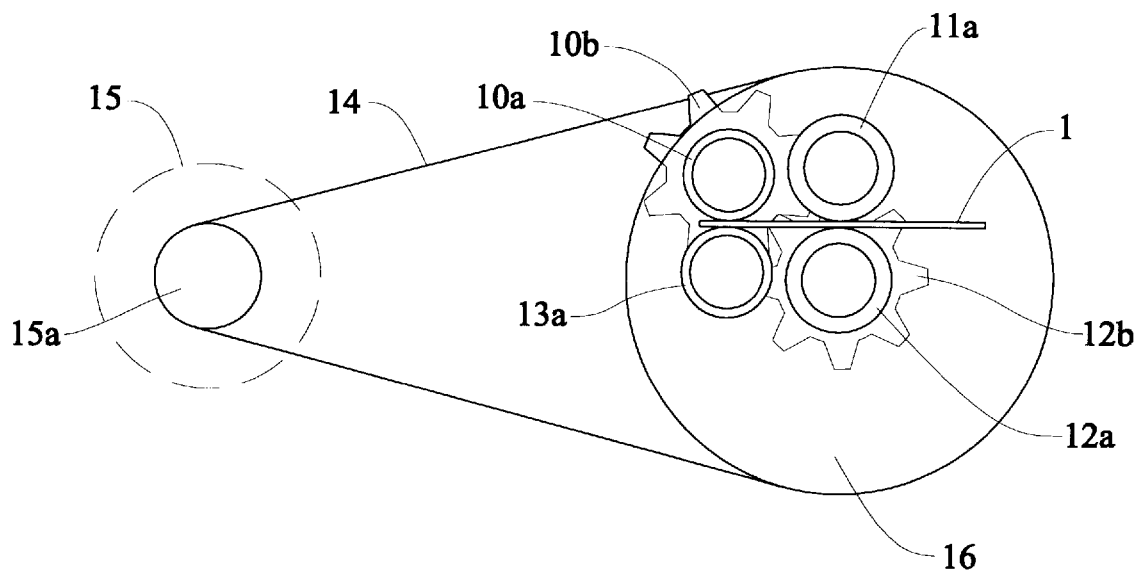
FIG. 3 is a top plan view of the drive assembly of the present invention and a compact disc passing between the rollers of the present invention.

In operation, a CD disc 1 is forced between the first set of rollers 11a, 12a and then through the second set of rollers 10a,13a. As seen in FIGS. 2 and 3, the second pair of rollers 12a,13a is laterally offset from the first pair of rollers 10a,11a.

In a preferred embodiment, the clearance between the first roller 10a and the second roller 11a is approximately ten thousandth of an inch. The clearance between the third roller 12a and the fourth roller 13a is also approximately ten thousandth of an inch. By comparison, a typical CD 1 is approximately fifty thousandths of an inch thick. As a result of this size difference, the two pairs of rollers 10a,11a and 12a,13a cooperatively compress a CD 1 passing therebetween. AS the disc is compressed, the patterns on the roller surfaces 20 become embossed into the top 4 and bottom surfaces 2 of the CD 1. Although a preferred pattern 20 on the rollers is shown in FIG. 5 to be a diamond-shaped pattern, other patterns would also suffice; rollers having flat surfaces may also be used.

As described above, there is an optimum clearance distance between the rollers within a pair 10a,11a and 12a,13a that produces desired destruction of the IBS 3. If rollers within a pair 10a,11a and 12a,13a are spaced apart too far, the IBS 3 will not be sufficiently disturbed to totally destroy all the information on the disc 1. However, excessive pressure, due to rollers 10a,11a and 12a,13a that are too close can cause large, information-carrying segments of the IBS 3 to flake off. Although the spacing roller is set at the factory, it may be maintained in the field.

Figure 4:
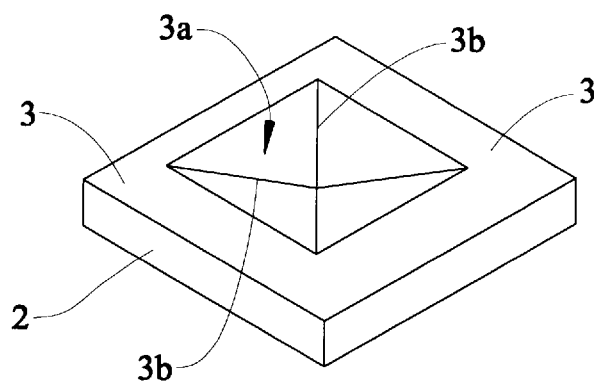
FIG. 4 is a partial close-up view of a compact disc showing the type of destruction accomplished with the present invention.

FIG. 4 shows a partial view of a CD 1 that has passed through the first and second pairs of rollers 10a,11a, and 12a,13a of the present invention 100. As shown in FIG. 4, the reflective metal layer 3 becomes riddled with distorted areas 3a, formed by lines of distortion 3b. After a CD 1 passes through the rollers 10a,11a,12a, and 13a, substantially the entire reflective layer 3 is characterized by areas of distortion 3a; the information previously stored on the CD is destroyed.

As noted above and shown in FIG. 3, the drive gears 10b, 12b engage one another. For example, driving gear 10b and attached roller 10a in a clockwise direction will turn gear 12b and attached roller 12a in a counter clockwise direction. This cooperative rotation will force a compact disc 1 between, and past, the first set of rollers 10a,11a. As the CD 1 emerges from between the first set of rollers 10a,11a, the CD will continue moving into the second set of rollers 12a,13a. Continued rotation of the drive gears 10b,12b produces continued rotation of the rollers 10a,11a,12a, and 13a, thereby forcing the disc 3 between and past the second pair of rollers 12a,13a. If more driving friction is needed, additional drive gears may be added, as mentioned above.

With reference to FIG. 5, a front elevation view of the first upper roller 10a is shown. The other rollers 11a,12a, and 13a have a similar appearance, and the description of the first roller 10a will serve to describe the remaining rollers 11a,12a, and 13a. Trunnions 22 extend from each end of the roller 10a. During use, the trunnions 22 rotatably extend through bearing plates 24,26 thereby allowing the roller 10a to turn in a supported manner. The bearing plates 24,26 may include roller mounting apertures, not shown, having ball bearings, not shown, to reduce friction between the bearing plates 24,26 and the roller trunnions 22.

With reference to FIG. 3, the drive assembly 28 of the present invention 100 is shown. As seen in FIG. 3, a single drive belt 14 links a drive pulley 16 with a motor pulley 15a. As will be described below, the drive pulley 16 is connected to the first roller 10a. More particularly, the drive pulley 16 is axially aligned with, and adjacent to, the first drive gear 10a. Rotation of the motor pulley 15a causes the drive 14 belt to rotate, thereby rotating the first drive gear 10a and the first roller 10a. Continued rotation of the drive pulley 14 will produce tandem rotation of the roller pairs 10a,11a and 12a,13a, as a CD is forced therebetween, as described above.

Although the drive assembly 28 has been described as including a drive belt 14, motor pulley 15a, a drive pulley 16 other arrangements could also be used. For example, the belt and pulley arrangement shown in FIG. 3 may replaced by a drive chain 14' and associated gears 15a', 16', as shown in FIG. 2.

As can be seen in FIG. 3, the drive assembly 28 includes a motor 15, a motor pulley 15a mounted on the drive shaft of motor 15, and a drive pulley 16. As mentioned above, a drive belt 14 links the motor pulley 15a with the drive pulley 16. As the shaft of the motor 15 rotates in a clockwise direction, the motor pulley 15a, drive pulley 16, and gear 11b are also driven in a clockwise direction.

It is noted that although the present invention has been described in terms of destroying in formation on compact discs, the present invention is not only useful for rendering data on compact discs unintelligible. The present invention could also be used to render unintelligible data on a variety of recording media, including, but not limited to analog phonograph records, digital video discs (DVD's), and laser video discs.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. An apparatus for rendering substantially all data contained on analog and digital recording media unintelligible, said apparatus comprising:
   means for progressively applying pressure throughout said media to render substantially all data inscribed on said media unintelligible;
   driving means for causing said media to traverse a path defined by said means for progressively applying pressure, said driving means being operatively associated with said means for progressively applying pressure,
   wherein when said media passes through said means for progressively applying pressure, the media is irreversibly distorted thereby, whereby substantially all data stored on said media is rendered unintelligible.

2. The apparatus of claim 1, wherein said means for progressively applying pressure includes at least one set of knurled rollers rotatably extending between a first support member and a second support member, said rollers having parallel axes and being spaced apart to create said path therebetween, said rollers having a length adapted to span said media.

3. The apparatus of claim 2, wherein:
   said means for embossing further includes a linking means for transferring rotational motion between said rollers,
   whereby each of said rollers rotates in tandem.

4. The apparatus of claim 2 wherein said means for applying pressure includes a second set of knurled rollers, said second set of rollers having parallel axes with each other and with said first set of rollers and being spaced from said first set of rollers along said path therebetween.

5. The apparatus of claim 4 wherein said first set of knurled rollers has a pattern of raised embossing lines thereon and said second set of knurled rollers has another pattern of raised embossing lines thereon.

6. The apparatus of claim 4 wherein said knurled rollers have a pattern of raised embossing lines thereon whereby said media is embossed with a pattern of embossed lines approximately 0.25 mm apart.

7. The apparatus of claim 1, wherein said driving means includes:
   an electric motor; and
   at least one drive gear operatively linking said motor gear to said means for embossing.

8. The apparatus of claim 1 wherein said means for applying pressure includes at least two sets of rollers, said first set of rollers rotatably extending between first support members and second support members, said first set of rollers having parallel axes and being spaced apart to create a path therebetween, said second set of rollers having parallel axes with said first set of rollers and spaced from said first set of rollers along said path therebetween, said first set and said second set of rollers having flat surfaces thereon.

9. The apparatus of claim 1, wherein said means for distorting includes at least one pair of having a flat surface rollers rotatably extending between a first support member and a second support member, said rollers having parallel axes and being spaced apart to create said path therebetween.

10. The apparatus of claim 9, wherein said driving means includes:
    an electric motor; and
    at least one drive gear operatively linking said motor gear to said means for distorting.

11. The apparatus of claim 9, wherein:
    said means for distorting further includes a linking means for transferring rotational motion between said rollers,
    whereby each of said rollers rotates in tandem.

12. A process for rendering data contained on digital or analog recording media unintelligible, said media including a label, comprising the following steps:
    a) providing a means for progressively applying pressure throughout said recording media to render substantially all data inscribed thereon unintelligible;
    b) providing a driving means for causing said media to traverse a path defined by said means for applying progressive pressure, said driving means being operatively associated with said means for progressively applying pressure; and
    c) causing a recording media to pass through said means for progressively applying pressure to irreversibly distort said recording media, whereby substantially all data stored on said recording media is rendered unintelligible and whereby said label is retained for archival purposes.

* * * * *